United States Patent [19]

Heiman

[11] Patent Number: 4,909,477

[45] Date of Patent: Mar. 20, 1990

[54] VACUUM DUMP VALVE

[75] Inventor: Stephen M. Heiman, Exton, Pa.

[73] Assignee: Microdot Inc., Chicago, Ill.

[21] Appl. No.: 403,170

[22] Filed: Sep. 5, 1989

[51] Int. Cl.[4] .................................................. F16K 51/02
[52] U.S. Cl. ..................................... 251/284; 251/295; 251/904
[58] Field of Search ............... 251/284, 904, 295, 321, 251/322

[56] References Cited

U.S. PATENT DOCUMENTS

| 891,672 | 6/1908 | Crane | 251/284 X |
|---|---|---|---|
| 2,179,165 | 11/1939 | Sifkovitz | 251/284 X |
| 3,181,555 | 5/1965 | Jacobson | 251/284 X |
| 3,203,665 | 8/1965 | Grant et al. | 251/284 X |
| 3,826,467 | 7/1974 | Hart et al. | 251/284 |
| 4,159,103 | 6/1979 | Jordan | 251/284 X |
| 4,413,804 | 11/1983 | Lanius et al. | 251/284 X |
| 4,449,692 | 5/1984 | Rhodes | 251/904 X |
| 4,750,707 | 6/1988 | Johncox et al. | 251/904 X |

Primary Examiner—John Rivell
Attorney, Agent, or Firm—Lyon & Delevie

[57] ABSTRACT

A vacuum dump valve comprises a housing having a cylindrical cavity therein communicating with ambient pressure and with a vacuum line, and a plunger in said cavity having a pair of diametrically spaced tabs acceptable in a pair of slots in said housing to limit travel and guide the plunger relative to the housing.

1 Claim, 1 Drawing Sheet

VACUUM DUMP VALVE

BACKGROUND OF THE INVENTION

It is known to use a vacuum dump valve comprising a spring loaded plunger that normally seals a vacuum line but which vents the line to atmosphere upon movement of the plunger. Such valves are used, for example, to sense depression of an automobile's brake pedal. In operation, the dump valve seals the speed control vacuum system when the brake pedal is the normal nondepressed condition and opens the vacuum system upon depression of the brake pedal to deenergize the auto's speed control system.

More specifically, known valves consist of a housing, plunger, O-ring, spring and washer. Assembly is accomplished by first inserting the plunger/O-ring/spring assembly into the housing and closing the housing with a metal washer which allows the end of the plunger to extend therethrough. The washer functions as a retainer and plunger guide. Washer retention is effected by preheating a plastic shoulder on the housing, positioning the washer, and reforming the softened plastic around the washer. The aforesaid construction and method of manufacture has caused problems in that the valve is process dependent. For example, irregularities in the plastic deformation necessary to retain the washer have been responsible for variations in valve performance.

SUMMARY OF THE INVENTION

The valve of the present invention is free from assembly process variations. Locking of the valve plunger in the housing is achieved by two small tabs that are molded directly on the plunger. The tabs cooperate with two slots in the outside wall of the valve housing. The housing deforms when the plunger is pushed thereinto until the tabs reach the slots in the housing whereupon the housing snaps back over the tabs. The plunger is then locked in. The slots serve to guide and align the plunger throughout its reciprocable travel. Three "snap-fit" beams are provided on the housing to retain the housing in a mounting bracket.

DETAILED DESCRIPTION OF THE PREFERRED EMBODIMENT OF THE INVENTION

Figure 1:
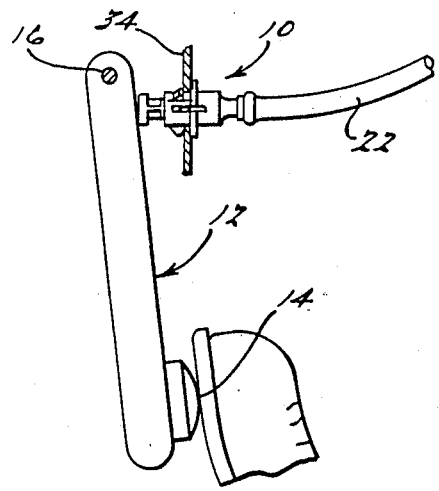
FIG. 1 is a diagrammatic view of the vacuum dump valve in operative relation to a brake pedal.

As seen n FIG. 1 of the drawing, a vacuum dump valve 10 is shown in operative association with a vehicle brake lever 12. The brake lever has a foot pedal 14 at a lower end thereof for operation by the driver of a vehicle. The brake lever is journaled on a pin 16 for rotation between a braking and nonbraking condition. A vacuum line 22 is secured to the valve 10 and to the vehicle speed control system (not shown).

Figure 2:
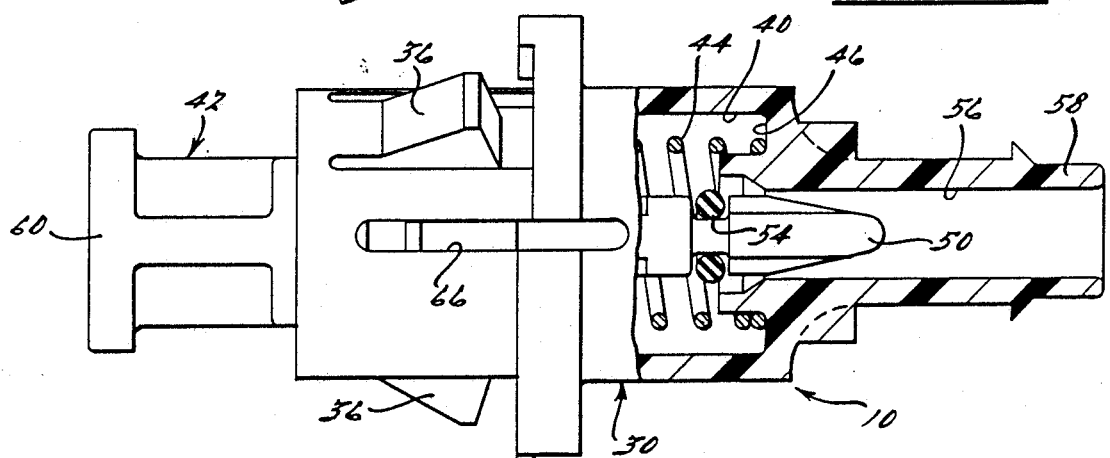
FIG. 2 is an elevational view, partially in section, of the dump valve in the vent condition.

As best seen in FIG. 2, the vacuum dump valve 10 comprises a tubular housing 30 having a radial flange 32 to effect positioning of the valve against a supporting panel 34 of a vehicle (not shown). The valve 10 is retained on the panel 34 by a plurality of resilient fingers 36 which abut the opposite side of the panel 34 from the flange 32.

The housing 30 has a cylindrical bore 40 for the acceptance of a plunger 42. The plunger 42 is normally biased to the left as seen in the drawings by a helical coil spring 44 that is seated in a complementary annular recess 46 in the housing 30 and bears against an annular shoulder 48 on the plunger 42.

Figure 3:
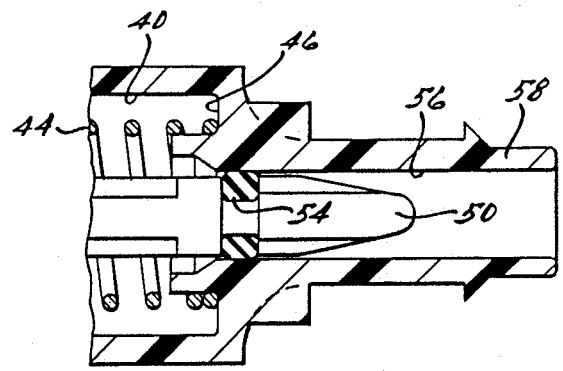
FIG. 3 is a view similar to FIG. 2 showing the valve plunger in the vacuum sealing condition.
Figure 4:
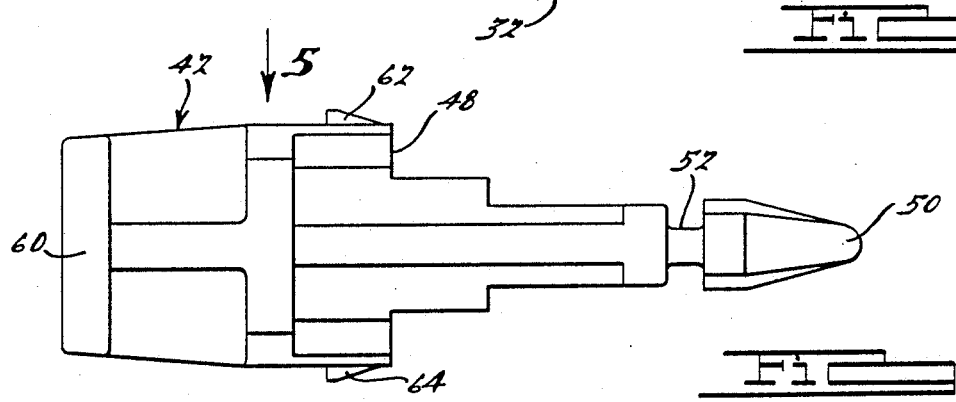
FIG. 4 is a elevational view of the plunger of the vacuum valve.
Figure 5:
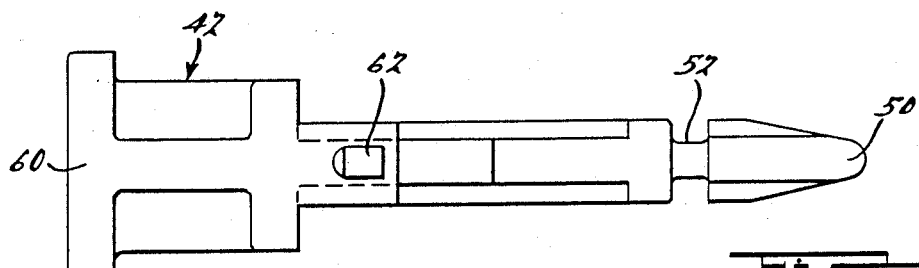
FIG. 5 is a view taken in the direction of the arrow 5 of FIG. 4.

As best seen in FIGS. 4 and 5 the plunger 42 has a nose portion 50 of bullet head configuration which leads to an annular channel 52 for seating of an O-ring 54. By comparing FIGS. 2 and 3 it will be seen that the plunge 42 carries the O-ring 54 from the position shown in FIG. 2 wherein vacuum in the line 22 is vented to atmosphere to the position shown in FIG. 3 wherein the O-ring 54 moves into a central bore 56 of a hose nipple 58 on the housing 30. This position is the normal nonbraking condition of the vacuum valve wherein the O-ring 54 seals the vacuum line 22 with respect to atmospheric pressure.

In accordance with the instant invention, the plunger 42 is provided with a foot portion 60 having a pair of diametrically spaced ears 62 and 64. The ears 62 and 64 are accepted in complementary channels 66, on the housing 30, one of which is shown in FIG. 2 of the drawing. The ears 62 and 64 effect radial expansion of the bore 40 in the tubular housing 30 upon insertion of the plunger 42 thereinto. After the ears 62 and 64 reach the channels 66, they snap thereinto and the housing 30 returns to its original circular configuration trapping the ears 62 and 64 in the channel 66 and thereby trapping the plunger 42 in the housing 30 of the valve 10.

In operation, when the brakes are off the pedal 14 is biased counterclockwise by a spring (not shown) keeping the plunger 42 depressed with the O-ring 54 squeezed into the bore 56 of the hose nipple 58 of the valve 10. In this condition, vacuum in the hose 22 is maintained.

When the brake lever 12 is depressed the plunger 42 is biased by the spring 44 so as to follow the moving brake lever 12. The O-ring 54 eventually escapes from the bore 56 and vacuum in the hose 22 is broken.

The valve 10 acts as a safety device for the cruise control system of a vehicle. As long as the brake is depressed, vacuum cannot be used to energize the cruise control vacuum motor since the vacuum dump valve is open to atmosphere.

While the preferred embodiment of the invention has been disclosed, it should be appreciated that the invention is susceptible of modification without departing from the scope of the following claims.

I claim:

1. In a vacuum dump valve comprising a housing having a cylindrical cavity therein communicating with ambient pressure and with a vacuum line, a plunger in said cavity, and means on said plunger for sealing said vacuum line relative to ambient atmosphere, an improved means for concomitantly retaining said plunger in the cavity of said housing and guiding said plunger for movement relative to said housing comprising a pair of diametrically spaced tabs on said plunger extending to a diameter greater than the diameter of said cavity, and a pair of slots in said housing complementary to the tabs on said plunger for the slidable acceptance thereof, said housing being deformable to permit entry of the tabs on said plunger into the slots of said housing whereby said tabs interact with the ends of said slots to limit travel of said plunger outwardly of said housing.

* * * * *